United States Patent
Roux et al.

(10) Patent No.: US 7,658,889 B2
(45) Date of Patent: Feb. 9, 2010

(54) DEVICE FOR REDISTRIBUTION OF CATALYST IN THE FCC RISERS

(75) Inventors: Romain Roux, Rueil Malmaison (FR); Patrick Leroy, Saint Vigor d'ymonville (FR); Thierry Patureaux, Fontaine la Mallet (FR)

(73) Assignees: Institut Francais du Petrole, Rueil Malmaison Cedex (FR); Total France, Paris la Defense Cedex (FR)

( * ) Notice: Subject to any disclaimer, the term of this patent is extended or adjusted under 35 U.S.C. 154(b) by 377 days.

(21) Appl. No.: 11/641,100

(22) Filed: Dec. 19, 2006

(65) Prior Publication Data

US 2007/0261992 A1    Nov. 15, 2007

(30) Foreign Application Priority Data

Dec. 21, 2005    (FR) .................................. 05 13065

(51) Int. Cl.
*F27B 15/08* (2006.01)
(52) U.S. Cl. ..................... 422/145; 422/214; 422/215; 422/224
(58) Field of Classification Search .............. 422/142, 422/140, 145, 214, 215, 224; 208/146, 113
See application file for complete search history.

(56) References Cited

U.S. PATENT DOCUMENTS

| | | | |
|---|---|---|---|
| 3,026,186 A | 3/1962 | Coty | |
| 3,353,925 A | 11/1967 | Baumann et al. | |
| 4,753,780 A * | 6/1988 | Bowen | 422/214 |
| 4,818,372 A * | 4/1989 | Mauleon et al. | 208/113 |
| 5,622,677 A | 4/1997 | Hadjigeorge et al. | |
| 6,146,519 A * | 11/2000 | Koves | 208/146 |
| 6,511,635 B2 * | 1/2003 | Mauleon et al. | 422/145 |
| 6,596,242 B1 * | 7/2003 | Dries | 422/139 |
| 6,613,290 B1 * | 9/2003 | Senior | 422/140 |
| 2002/0112988 A1 | 8/2002 | Mauleon et al. | |

* cited by examiner

*Primary Examiner*—N. Bhat
(74) *Attorney, Agent, or Firm*—Millen, White, Zelano & Branigan, P.C.

(57) ABSTRACT

In a catalytic FCC cracking unit comprising a vertically disposed riser housing a reaction zone, the improvement comprising at least one device for redistribution of catalyst inside said reaction zone, the catalytic cracking unit being equipped at a plane with feedstock injectors, and an upper plane, with mixed temperature control (MTC) injectors, wherein said device has the general shape of a continuous ring adjacent the riser wall and along the inside periphery of said wall, said device creating a restriction in the cross section of the riser ranging between 30% and 45%, having a profile section at least partially rectilinear, and being located a) either in a zone encompassed between the plane of the feedstock injectors and the plane of the MTC injectors, b) or at a height of between 0.1 and 5 meters above the plane of the MTC injectors.

21 Claims, 3 Drawing Sheets

Figure 1:
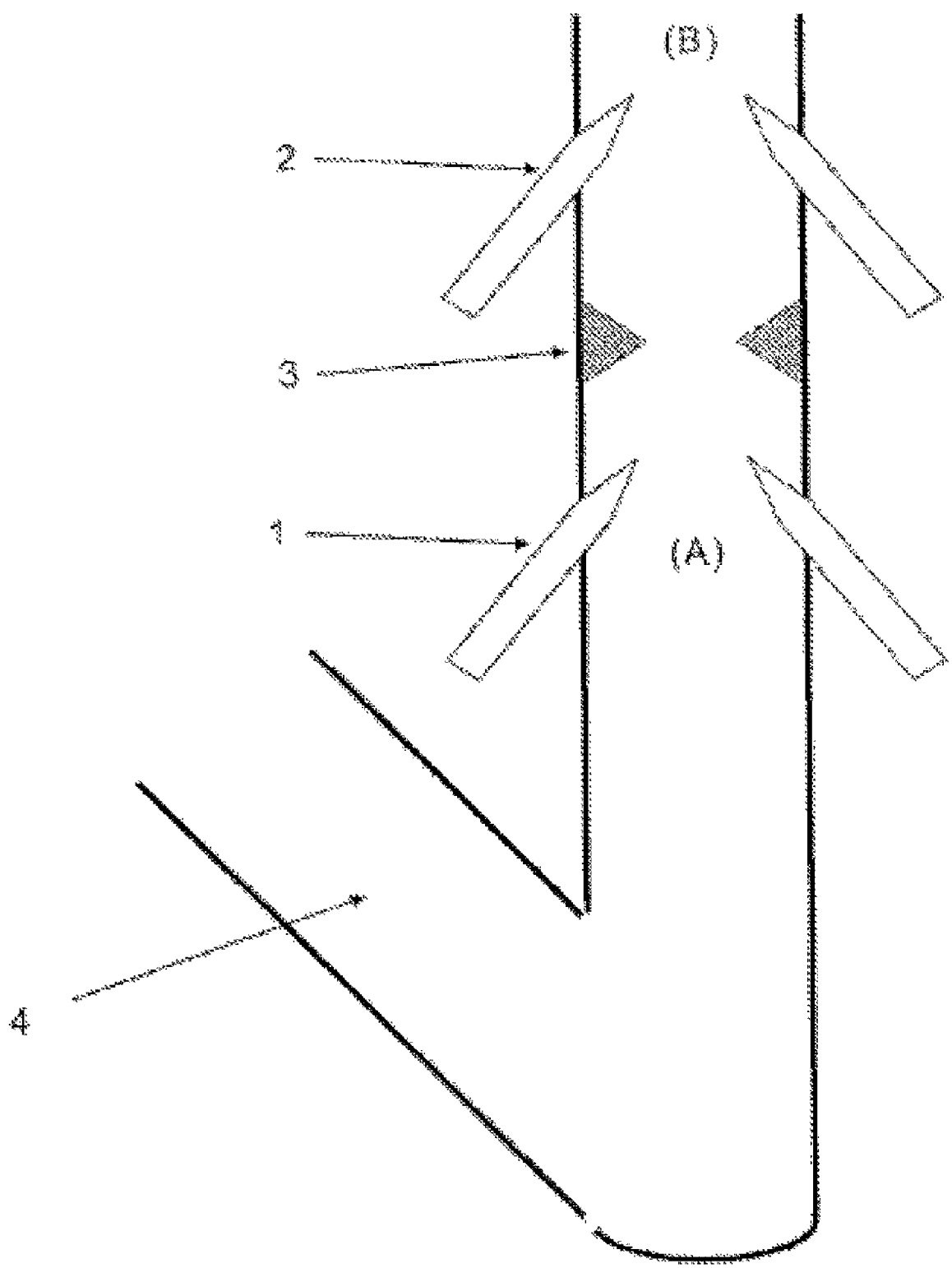

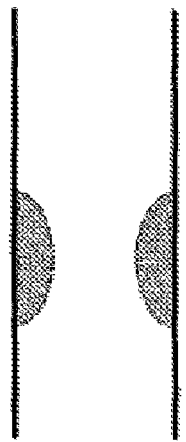
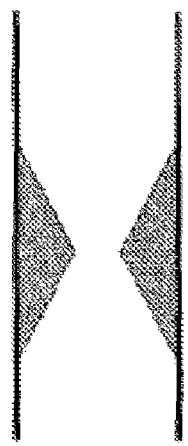
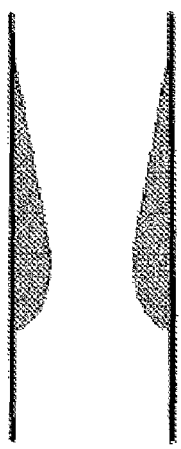
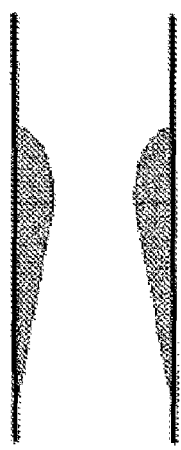
FIGURE 2a    FIGURE 2b    FIGURE 2c    FIGURE 2d
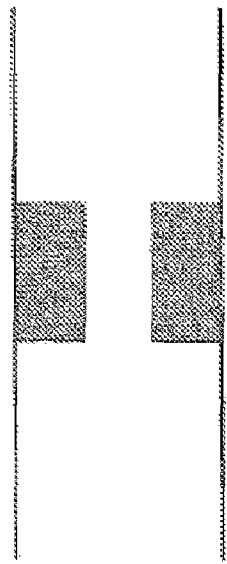
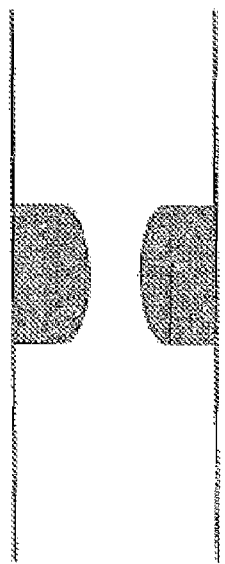
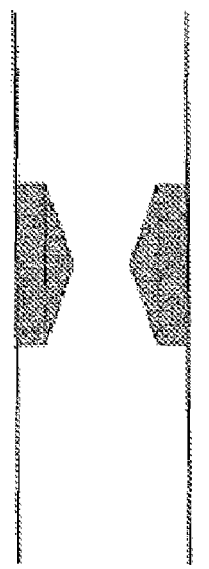
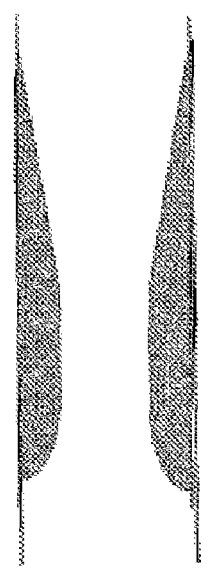
Figure 2e    Figure 2f    Figure 2g    Figure 2h

DEVICE FOR REDISTRIBUTION OF CATALYST IN THE FCC RISERS

FIELD OF THE INVENTION

The field of the invention is that of fluidized-bed catalytic cracking units, denoted FCC in abbreviated form, essentially making it possible to transform vacuum distillate-type fractions, atmospheric or vacuum residues that may or may not be hydrotreated, into a base for gasoline, gas oil and LPG. It also applies to catalytic cracking units that work under severe conditions for the purpose of maximizing the output of olefins, units designated by one skilled in the art under the term of petrochemical FCC.

The FCC units, conventional or petrochemical, generally consist of a reaction zone of elongated tubular shape along an essentially vertical axis called a "riser" in English terminology. In the text below, the terminology "riser" will be retained for designating the reaction zone.

At the base of the riser, the liquid feedstock is introduced through one or a number of injectors that transform it into droplets, and then these droplets are evaporated upon contact with the hot catalyst obtained from the regeneration zone.

The cracking reactions take place consecutively to the evaporation of the feedstock between, on the one hand, the feedstock in the gaseous state, and, on the other hand, the catalyst in suspension entrained by the reaction flow.

The conversion of the feedstock by the cracking reaction is defined as the amount of feedstock that has reacted based on the amount of incoming feedstock, the amount of feedstock that has reacted itself being defined as the incoming feedstock reduced by the production of LCO (petroleum fraction whose distillation interval is between 220° C. and 360° C.) and the "slurry" fraction (petroleum fraction whose distillation begins starting from 360° C.).

In the FCC units, the catalyst is divided in the form of particles with a diameter of typically between 30 and 120 microns, with a mean value located around 70 microns.

The deactivation of the catalyst in the injection zone and in the reaction zone is due in particular to the formation of coke on the surface of the catalyst.

In certain FCC units, the injection of feedstock is followed at a certain distance above the plane of the feedstock injectors by an injection of an inert fluid or conversion fluid with regard to cracking reactions, called MTC injection (abbreviation of Mixed Temperature Control, which can be defined as temperature control means), which has as its object to control the temperature profile in the lower portion of the riser.

The injectors of an FCC unit are generally oriented upward. Certain FCC units have injectors directed downward. This invention also applies to this type of unit.

This invention can therefore be applied to any fluidized-bed catalytic cracking unit that is equipped with a riser comprising a system for injecting the feedstock and optionally an MTC-type temperature control system.

The invention still also applies to FCC units that are not equipped with an MTC control system.

EXAMINATION OF THE PRIOR ART

It is known to one skilled in the art that the distribution of the catalyst inside the FCC risers is not homogeneous. In each section of the riser located in the evaporation zone, the catalyst is preferably concentrated at the wall giving rise to a partial vacuum toward the center. The core-ring model is mentioned for representing such an unequal radial distribution between the center of the riser and the walls.

In addition, the catalyst at the wall is subjected to a redescending movement called retromixing or recirculation, which has the result of putting the catalyst that has already encountered the feedstock, therefore partially cooled, in contact with the fresh feedstock. The impact of this retromixing on the reactions is negative since it promotes the development of secondary supercracking reactions, ultimately giving rise to heavy coke-type condensation products and gases, to the detriment of the yield of gasoline, LPG and gas oil.

Several devices or lay-outs of the evaporation zone have been studied for fighting against the retromixing phenomenon.

It is possible to cite the U.S. Pat. No. 3,353,925 that discloses a series of restriction zones called "Venturi contactors" distributed over the entire length of the riser (in the cited text, the riser is denoted "transfer line") designed to reduce the retromixing phenomenon. In this patent, no information is provided on the form and the degree of restriction provided by the so-called Venturi contactors. It is said only that the flow rate of the gas-solid suspension in the passing of restrictions is between 9 and 12 m/s based on the elevation in the riser. Our invention teaches shapes and numbered restriction levels and, in addition, relates only to the evaporation zone and not to the entire riser.

More recently, the U.S. Pat. No. 5,997,726 describes a zone for bringing the hydrocarbon feedstock into contact with the catalyst, applicable to downward flows comprising a restriction zone located below the injection plane of the feedstock. The downward flows are well known to one skilled in the art for bringing about a reduction of the retromixing. In addition, in this invention, the restriction zone is placed above the injection plane.

The document US 2002/112988 describes a device that is located inside an FCC unit riser and placed above injectors, having an annular shape and leading to a section reduction of between 5 and 30%. The rate of reduction of the section of the riser in this invention is clearly more important than the one disclosed in the cited document.

SUMMARY DESCRIPTION OF THE FIGURES

FIG. 1 provides the general configuration of the injection zone of an equipped FCC unit of the device according to this invention.

In a nonlimiting manner, FIGS. 2a, 2b, 2c, 2d, 2e, 2f, 2g and 2h illustrate various shapes of the redistribution device according to the invention.

Figure 3:
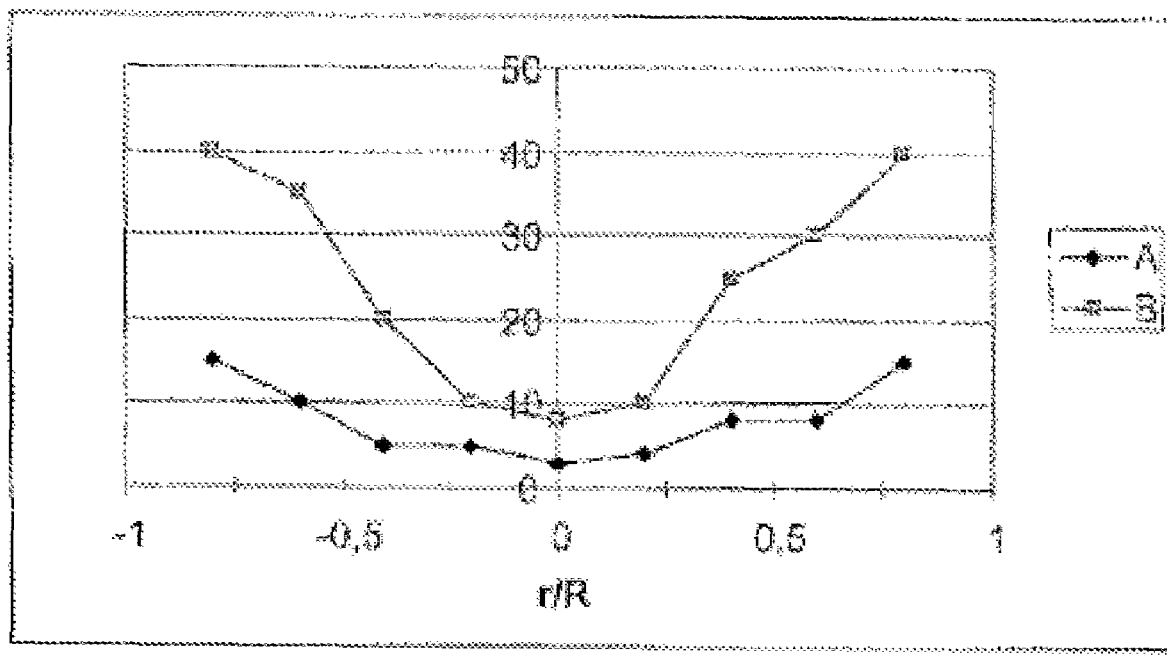

The curves A and B shown in FIG. 3 show a comparison of radial profiles of catalyst flow with and without the redistribution device and are used to illustrate the comparison example.

SUMMARY DESCRIPTION OF THE INVENTION

The invention consists of a device for redistribution of the catalyst inside the reaction zone of a catalytic cracking unit (called a "riser" in the terminology of one skilled in the art) comprising feedstock injectors located on a first plane and MTC injectors located on a second plane at a higher level than the first plane.

A redistribution device is defined as a single device going around the inside riser wall in a continuous and uninterrupted manner.

In a first variant of the invention, the device for redistribution of the catalyst according to the invention is placed in the zone encompassed between the plane of the feedstock injectors and the plane of the MTC injectors.

In a second variant of the invention, the device for redistribution of the catalyst according to the invention is located at a height of between 0.1 and 5 meters, and preferably between 2 and 4 meters above the plane of the feedstock injectors. This variant makes it possible to cover a figure case where the FCC unit being considered would not have MTC injectors.

In a third variant of the invention, the device for redistribution of the catalyst according to the invention is located at a height of between 0.1 and 5 meters, and preferably between 2 and 4 meters above the plane of the MTC injectors.

Plane of feedstock injectors is defined as the approximately horizontal plane that passes through the intersection between said injectors and the outside riser wall. As, strictly speaking, this intersection extends over a certain height corresponding to the projection of the diameter of the injector along the vertical riser wall, let us recall, to avoid any ambiguity, that the plane of the feedstock injectors is the plane passing through the mid-height of the intersection defined above. The plane of the MTC injectors is defined in the same way.

Finally, according to another variant of this invention, it is possible to install two redistribution systems according to this invention, the first located between the plane of the feedstock injectors and the plane of the MTC injectors, and the second located at a height of between 0.1 and 5 meters above the plane of the MTC injectors.

The section of said redistribution device may have very diverse shapes, partially or fully rectilinear, and/or partially or fully curvilinear, only some of which will be illustrated, without this constituting any limitation.

DETAILED DESCRIPTION OF THE INVENTION

This description will be better understood by following FIG. 1.

This invention relates to a device equipping the lower portion of an FCC riser so as to improve the radial distribution of the catalyst in said zone. In the text below, this device will be called a device for redistribution of catalyst.

The lower portion of an FCC riser conventionally comprises a pipe for intake of the catalyst (4) that is obtained from the regeneration zone (not shown in FIG. 1), an injection zone (A) comprising a feedstock injection system (1) and optionally a system for injection of a temperature monitoring fluid called MTC (2) located above the feedstock injectors.

The injection zone (A), also called an acceleration zone or else an evaporation zone, extends from the injection level of the feedstock up to about 4 to 5 meters above. A second zone (B) following the first in the direction of flow of the reaction fluids extends to the top of the riser.

The acceleration zone (A) is characterized by relatively low gas flow rates on the order of several meters/second and high catalyst densities, while the second zone (B) corresponds to gas flow rates that can reach 30 m/s and lower catalyst densities than in the acceleration zone.

The types of flow are very different in each of the zones.

The acceleration zone (A) has high catalyst recirculations and is often compared to a "perfect-mixing"-type zone, whereas the second zone (B) better approximates a "piston"-type flow.

In the acceleration zone (A), the catalyst particles are gradually accelerated both under the effect of the evaporation of the feedstock that generates a gas stream and under the effect of the gas cracking reactions that accompany a molar expansion.

This invention applies to the acceleration zone (A) of an FCC unit riser and is intended to homogenize the distribution of the catalyst within said zone.

The impact of a more or less homogeneous distribution of the catalyst within the acceleration zone is important, because the majority of the reactions take place there, and it is advisable to avoid as much as possible the phenomenon of the "second encounter" of the catalyst with the feedstock.

The term "second encounter" refers to a contact between the fresh feedstock and the catalyst that is partially deactivated by a deposit of coke, since having already a first time encountered the feedstock, obtained from the recirculation of the wall catalyst.

The catalyst that is concentrated at the wall descends again in counter-current toward the feedstock injection zone to mix with fresh catalyst. Reference is made to recirculation (or "backmixing") in the language of one skilled in the art. This type of contact is for the most part responsible for the development of parasitic reactions that lead to the production of coke and gas.

Density measurements of the catalyst that are performed in the zone for acceleration of the riser of an FCC unit showed that the catalyst has a tendency to be distributed preferably at the wall of said riser, while the center of the riser is relatively low in catalyst. The catalyst that is concentrated at the wall and inadequately accelerated recirculates toward the feedstock injection zone. This unequal distribution can be combated by internals that will bring the catalyst from the periphery to the center of the riser and will reduce the recirculations. Such is the main object of this invention.

The invention therefore consists of a device for redistribution of the catalyst that has the general shape of a continuous ring (3) that is adjacent to the riser wall (R1) of an FCC unit, located in the injection zone (A) and determining a reduced passage section for the circulating gas-solid suspension, said reduced section having a value of between 10% and 70% of the section of the riser (R1) and preferably between 30% and 45% of the section of the riser (R1).

The device for redistribution of the catalyst (3) will be positioned at a distance of between 0.1 meter and 5 meters, and preferably between 2 meters and 4 meters above the plane of the feedstock injectors (1).

When the FCC unit is equipped with MTC-type injectors (2), the system for redistribution of the catalyst advantageously will be located between the plane of the feedstock injectors (1) and the plane of the MTC injectors (2).

A second device for redistribution can then be located above the MTC injection so as to obtain the effect of more homogeneous distribution of the catalyst both at the level of the feedstock injection zone and at the level of the zone for evaporation of the fluid used for the MTC injectors.

The shape of the redistribution device (3) can vary quite broadly, but will generally be one of the types described below, in consideration of the section of said redistribution device.

In the description below, reference is made to the upper edge to designate the edge of the section of the redistribution device that is located above the plane that corresponds to the reduced section, and reference is made to the lower edge to designate the edge of the section of the redistribution device that is located below the plane that corresponds to the reduced section. In a general manner, the edges can be fully rectilinear, fully curvilinear, or partially rectilinear and partially curvilinear. The upper edge may or may not be symmetrical with the lower edge.

Shape 1: Of rectilinear type, the upper edge may be larger or smaller than the lower edge.

This shape is illustrated by FIG. 2b, which shows a triangular section.

A rectangular section, as illustrated by FIG. 2e, or more generally polygonal as illustrated in FIG. 2g, is completely within the scope of the invention.

Shape 2: Of curvilinear type, this shape designating edges of curvilinear shape. This shape is illustrated by FIG. 2a, which shows a circular section.

An ellipsoidal or imperfectly circular section is completely within the scope of the invention.

Shape 3: Of mixed type, i.e., with a rectilinear upper edge and a curvilinear lower edge, or the opposite, i.e., with a curvilinear upper edge and a rectilinear lower edge.

This shape is illustrated by FIGS. 2c and 2d.

Shape 4: This type combines shapes having edges comprising both a rectilinear portion and a curvilinear portion. This type is illustrated by FIG. 2f, which shows a device that has both a rectangular and curvilinear edge. Other shapes that combine a curvilinear portion and a rectilinear portion on the same edge fall within the scope of the invention. Such a shape is illustrated by FIG. 2h.

The preferred shapes are the triangular shape (FIG. 2b), the rectangular shape (FIG. 2e), the curvilinear shape (FIG. 2a), and the shapes that are illustrated by FIGS. 2c, 2d and 2h.

Thus, according to a first variant, the device for redistribution of the catalyst according to the invention will have a section of triangular shape.

According to a second variant, the device for redistribution according to the invention will have a section of curvilinear, and preferably circular, shape.

According to a third variant, the device for redistribution according to the invention will have a section of rectangular shape.

According to a fourth variant, the device for redistribution according to the invention will have a section of rectangular, then circular, shape.

According to a fifth variant, the device for redistribution according to the invention will have a section of rectangular, then triangular, shape.

According to a sixth variant, the device for redistribution according to the invention will have a section of rectangular, then curvilinear, shape.

According to a seventh variant, the device for redistribution according to the invention will have a section of partially curvilinear and partially rectilinear shape.

The device for redistribution according to the invention should be able to resist as much as possible the erosion following the friction with the gas-solid suspension, and for this reason will be carried out in a hard material, generally refractory concrete, and preferably will be carried out in a refractory concrete that is similar to the one covering the inside riser wall and optionally reinforced by an internal metal reinforcing structure.

EXAMPLE ACCORDING TO THE INVENTION

An experiment was conducted on a mock-up reproducing the circulation of the catalyst and gases on a scale of about ⅕ that of an FCC industrial unit.

The primary dimensions of this mock-up as well as the catalyst flow rate and the gas flow rate in the riser are provided below:

Height of the riser: 15 meters
Inside diameter of the riser: 0.3 m
Flow rate of the catalyst of between 30 tons/hour and 60 tons/hour
Flow rate of the gas of between 5 m/s and 12 m/s
Catalyst flow of between 115 and 235 kg/m2·s The catalyst consists of particles with a mean diameter of 72 microns, exhibiting a grain size distribution with a percentage of particles of less than 40 microns that is equal to 15% by weight.

The density of the catalyst particles is 1250 kg/m3.

The feedstock is injected through two diametrically opposite injectors that are conventionally located in the side 0 plane and that deliver droplets of about 100 microns in diameter.

Two MTC injectors are located on a plane that is more than 1 meter above the plane of the feedstock injectors.

The flow measurements of the catalyst have been made with and without a redistribution device so as to evaluate its effect on the radial distribution of the catalyst.

For this purpose, a sampling rod, called "isokinetic," was used, and said rod has an inside diameter of 8 mm, which makes it possible to recover catalyst samples on a vertical side determined along the riser and at different depth levels referenced by the parameter r/R that was set at the following values:

−1; −0.8; −0.6; −0.4; −0.2; 0; 0.2; 0.4; 0.6; 0.8 and 1.

The position r/R=0 corresponds to the center of the riser. The positions r/R=1 and r/R=−1 correspond to the riser wall. The other positions are positions at intermediate depths.

The set of positions makes it possible to sweep the section of the riser being considered in a complete diameter.

On the ordinate on the curve shown in FIG. 3, values +10%, +20%, +30%, +40% and +50% were shown relative to the value of the flow in the center of the riser (r/R=0).

The redistribution device is a ring of triangular section covering the entire circumference of the riser wall. The distance that separates the riser wall from the point of the triangle is 5 cm and determines a reduced section of the riser of 44.4%.

The redistribution device is placed between 0.58 meter above the plane of the injectors or between the plane of the feedstock injectors and the plane of the MTC injectors. This distance of 0.58 meter corresponds approximately to a height of 3 meters above the plane of the injectors in an industrial unit that has a riser with a diameter of 1.5 meters.

The curves A (with a redistribution device) and B (without a redistribution device) shown in FIG. 3 respectively represent the radial distribution of the catalyst with and without a redistribution device, taken on the side 400 mm above the level of the injectors.

The catalyst flow is expressed in kg/m2·s relative to the minimum flow that is located in the center of the riser in the configuration with the redistribution device.

The curve B (without a redistribution device) shows an inhomogeneous catalyst flow that is very clearly higher close to the riser wall.

By comparison of the curves A and B, the effect of flattening of the distribution of the catalyst due to the redistribution device is very clearly visible. There results a probability of contact with the evaporated feedstock that is obtained from much more homogeneous injectors over the section of the riser in the case with the redistribution device (curve A).

Likewise, the mean flow of catalyst with a redistribution device (mean curve A) is less than the mean catalyst flow without a redistribution device (mean curve B), which, for the same operating conditions, demonstrates a very clear reduction of the recirculations of partially deactivated catalyst toward the feedstock injection zone in the case with a redistribution device (curve A).

Ultimately, a more significant conversion into desired products is obtained, in particular gasoline and gas oil.

The curves A and B shown in FIG. 3 were obtained at a gas flow rate of 5 m/s, and a catalyst flow rate of 33 tons/hour corresponding to a mean catalyst flow of 130 kg/m2·s.

The gas flow rate Vg=5 m/s represents the actual flow rate of the gas in the evaporation zone of an industrial unit that, let us recall, varies both because of the evaporation of the feedstock and the cracking reaction (by molar expansion).

These experimental results show the better homogeneity of the distribution of the catalyst in the injection zone, and the reduction of the retromixing provided by the redistribution device, which are reflected by an improvement of the conversion that can be estimated at about 1% by weight.

The effect of the better homogenization and reduction of the retromixing is obtained from the combination of the characteristics of the redistribution device, namely its annular shape, its position between the plane of the feedstock injectors and the plane of the MTC injectors, and the restriction level of the section of the riser or 44.4%.

Other shapes of the section of the redistribution device have been tested, in particular one shape comprising a rectilinear portion and a curvilinear portion as shown in FIGS. 2c and 2f. These shapes lead to the same effect of flattening of the radial flow profile, without a particular shape leading to performance levels that are clearly better relative to one another. The triangular shape is the simplest to produce.

The preceding examples can be repeated with similar success by substituting the generically or specifically described reactants and/or operating conditions of this invention for those used in the preceding examples.

The entire disclosures of all applications, patents and publications, cited herein and of corresponding French application No. 05/13.065, filed Dec. 21, 2005 is incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. In a fluidized catalytic cracking unit comprising a vertically disposed riser housing a reaction zone, the improvement comprising at least one redistribution device for redistribution of catalyst inside said reaction zone, the catalytic cracking unit comprising feedstock injectors at a plane within the riser, and at a plane above the feedstock injectors, mixed temperature control (MTC) injectors, wherein said redistribution device has the general shape of a continuous ring adjacent the riser wall and along the inside periphery of said wall, said redistribution device creating a restriction in the cross section of the riser ranging between 30% and 45% and having a profile section at least partially rectilinear, and being located a) either in a zone encompassed between the plane of the feedstock injectors and the plane of the MTC injectors, or b) at a height of between 0.1 and 5 meters above the plane of the MTC injectors.

2. A cracking unit according to claim 1, comprising at least two of said devices, a first device being located between the plane of the feedstock injectors and the plane of the MTC injectors, and a second device being located at a height of between 0.1 and 5 meters above the plane of the MTC injectors.

3. A cracking unit according to claim 1, wherein the profile section of the redistribution device is of a triangular shape.

4. A cracking unit according to claim 1, wherein the profile section of the redistribution device is of a rectangular shape.

5. A cracking unit according to claim 1, wherein a profile section of the redistribution device is rectangular in a first portion and circular in a second portion.

6. A cracking unit according to claim 1, wherein a section of the redistribution device is rectangular in a first portion and triangular in a second portion.

7. A cracking unit according to claim 1, wherein a section of the redistribution device is rectangular in a first portion and curvilinear in a second portion.

8. A cracking unit according to claim 1, wherein a section of the redistribution device has a mixed shape partly with a curvilinear portion and partly a rectilinear portion.

9. A cracking unit according to claim 1, wherein the riser comprises an inside coating of refractory concrete and the redistribution device comprises a refractory concrete similar to that of the inside riser wall.

10. A device according to claim 2, wherein the second redistribution device is located at a height between 2 and 4 meters above the plane of the MTC injectors.

11. A cracking unit according to claim 2, wherein the profile section of the redistribution device is of a triangular shape.

12. A cracking unit according to claim 2, wherein the profile section of the redistribution device is of a rectangular shape.

13. A cracking unit according to claim 2, wherein a profile section of the redistribution device is rectangular and circular.

14. A cracking unit according to claim 2, wherein a section of the redistribution device is rectangular in a first portion and curvilinear.

15. A cracking unit according to claim 2, wherein a section of the redistribution device is rectangular in a first portion and curvilinear.

16. A cracking unit according to claim 2, wherein a section of the redistribution device has a mixed shape partly with a curvilinear portion and partly a rectilinear portion.

17. A cracking unit according to claim 2, wherein the riser comprises an inside coating of refractory concrete and the redistribution device comprises a refractory concrete similar to that of the inside riser wall.

18. A device according to claim 2, wherein the second redistribution device is located at a height between 2 and 4 meters above the plane of the MTC injectors.

19. In a fluidized catalytic cracking unit comprising a vertically disposed riser housing a reaction zone, the improvement comprising at least one device for redistribution of catalyst inside said reaction zone, the catalytic cracking unit being equipped at a plane with feedstock injectors, and at a plane above the feedstock injection, mixed temperature control (MTC) injectors, wherein said redistribution device has the general shape of a continuous ring adjacent the riser wall and along the inside periphery of said wall, said redistribution device creating a restriction in the cross section of the riser ranging between 30% and 70% and having a profile section at least partially rectilinear, and being located a) either in a zone encompassed between the plane of the feedstock injectors and the plane of the MTC injectors, b) or at a height of between 0.1 and 5 meters above the plane of the MTC injectors.

20. A cracking unit according to claim 19, wherein the redistribution device is located in a zone between the plane of the feedstock injectors and the plane of the MTC injectors.

21. A cracking unit according to claim 20, wherein the redistribution device comprises a rectilinear portion and a curvilinear portion.

* * * * *

UNITED STATES PATENT AND TRADEMARK OFFICE
CERTIFICATE OF CORRECTION

PATENT NO.        : 7,658,889 B2                                  Page 1 of 1
APPLICATION NO. : 11/641100
DATED             : February 9, 2010
INVENTOR(S)       : Roux et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 429 days.

Signed and Sealed this

Thirtieth Day of November, 2010

David J. Kappos
*Director of the United States Patent and Trademark Office*